(12) United States Patent
Beifuss et al.

(10) Patent No.: US 10,559,302 B2
(45) Date of Patent: Feb. 11, 2020

(54) DOMESTIC APPLIANCE HAVING VARIABLE SECURITY BASED ON AUTOMATIC DETERMINATION OF USER SUPERVISION

(71) Applicant: BSH Hausgeräte GmbH, Munich (DE)

(72) Inventors: Wolfgang Beifuss, Chieming (DE); Uwe Has, Unterneukirchen (DE)

(73) Assignee: BSH Hausgeräte GmbH, Munich (DE)

( * ) Notice: Subject to any disclaimer, the term of this patent is extended or adjusted under 35 U.S.C. 154(b) by 139 days.

(21) Appl. No.: 15/564,211

(22) PCT Filed: Feb. 5, 2016

(86) PCT No.: PCT/EP2016/052511
§ 371 (c)(1),
(2) Date: Oct. 4, 2017

(87) PCT Pub. No.: WO2016/165848
PCT Pub. Date: Oct. 20, 2016

(65) Prior Publication Data
US 2018/0130466 A1     May 10, 2018

(30) Foreign Application Priority Data

Apr. 13, 2015 (DE) .................. 10 2015 206 566

(51) Int. Cl.
*G10L 15/22* (2006.01)
*H04L 12/28* (2006.01)
(Continued)

(52) U.S. Cl.
CPC ............... *G10L 15/22* (2013.01); *F24C 7/08* (2013.01); *G06F 3/017* (2013.01); *G06F 3/0304* (2013.01);
(Continued)

(58) Field of Classification Search
CPC . H04L 12/2803; H04L 12/2823; G10L 17/10; G10L 2015/227; G10L 15/22; G06F 1/3228; G06F 1/3231
See application file for complete search history.

(56) References Cited

U.S. PATENT DOCUMENTS 9,298,339 B2 * 3/2016 Unpingco ........... G06F 16/2423
9,759,917 B2 * 9/2017 Osterhout .......... G02B 27/0093
(Continued)

FOREIGN PATENT DOCUMENTS

DE     10256464 A1   6/2004
DE     10336814 A1   3/2005
(Continued)

OTHER PUBLICATIONS

National Search Report DE 10 2015 206 566.9 dated Feb. 15, 2016.
International Search Report PCT/EP2016/052511 dated Mar. 30, 2016.

*Primary Examiner* — Michael N Opsasnick
(74) *Attorney, Agent, or Firm* — Michael E. Tschupp; Andre Pallapies; Brandon G. Braun

(57) ABSTRACT

A domestic appliance includes a user interface for a user to input commands, a camera for taking an image of an operating area from which the user interface can be operated by the user, a speech recognition device for detecting a speech command, and a control device configured to determine a level of security depending on the image that was taken by the camera and to execute the speech command detected by the speech recognition device depending on the level of security that has been determined.

16 Claims, 4 Drawing Sheets

(51) Int. Cl.
*G10L 15/01* (2013.01)
*G06K 9/00* (2006.01)
*F24C 7/08* (2006.01)
*G06F 3/03* (2006.01)
*G06F 3/01* (2006.01)
*G10L 17/00* (2013.01)

(52) U.S. Cl.
CPC .......... *G06K 9/00664* (2013.01); *G10L 15/01* (2013.01); *H04L 12/282* (2013.01); *G06F 2203/0381* (2013.01); *G10L 17/00* (2013.01); *G10L 2015/223* (2013.01); *G10L 2015/228* (2013.01); *H04L 2012/285* (2013.01)

(56) References Cited

U.S. PATENT DOCUMENTS

| | | | |
|---|---|---|---|
| 2003/0161490 A1 | 8/2003 | Maase | |
| 2005/0192727 A1* | 9/2005 | Shostak | B60C 11/24 701/37 |
| 2008/0084296 A1* | 4/2008 | Kutzik | G06F 19/3418 340/540 |
| 2008/0297586 A1* | 12/2008 | Kurtz | H04N 7/147 348/14.08 |
| 2008/0297588 A1* | 12/2008 | Kurtz | H04N 7/147 348/14.08 |
| 2009/0327957 A1* | 12/2009 | Cheng | G06F 3/011 715/810 |
| 2014/0100955 A1* | 4/2014 | Osotio | G06F 3/011 705/14.55 |
| 2014/0330560 A1* | 11/2014 | Venkatesha | G06F 21/32 704/235 |
| 2015/0310259 A1* | 10/2015 | Lau | G07C 9/00 382/118 |
| 2016/0292696 A1* | 10/2016 | Gong | G06F 16/29 |
| 2017/0124842 A1* | 5/2017 | Sinha | G05B 19/048 |

FOREIGN PATENT DOCUMENTS

| | | |
|---|---|---|
| DE | 102006030550 A1 | 1/2008 |
| DE | 202013007455 U1 | 9/2013 |

* cited by examiner

DOMESTIC APPLIANCE HAVING VARIABLE SECURITY BASED ON AUTOMATIC DETERMINATION OF USER SUPERVISION

CROSS-REFERENCES TO RELATED APPLICATIONS

This application is the U.S. National Stage of International Application No. PCT/EP2016/052511, filed Feb. 5, 2016, which designated the United States and has been published as International Publication No. WO 2016/165848 A1 and which claims the priority of German Patent Application, Serial No. 10 2015 206 566.9, filed Apr. 13, 2015, pursuant to 35 U.S.C. 119(a)-(d).

BACKGROUND OF THE INVENTION

The present invention relates to a domestic appliance and a method for operating a domestic appliance.

Speech recognition is already being employed for operating domestic appliances. Operation by using speech recognition means that a user's hands are free for other uses. Apart from that, the user can operate the domestic appliance with speech recognition without dirtying it, e.g. when a domestic appliance for the kitchen is involved and the user is currently engaged in cooking.

DE 20 2013 007 455 U1 discloses a cooker with speech recognition. The cooker has a permanently activated camera. The speech recognition is only activated once the camera has recorded a specific operating gesture by the user. By means of the operating gesture the user signals the wish to make use of the speech recognition facility for the cooker.

EP 1 341 158 A2 discloses a speech recognition facility for a fume extractor hood. The fume extractor hood has a speech operating unit with a microphone. Additionally a sensor is provided, which is used as a motion detector and which only switches on the microphone upon receiving a signal.

The cookers described only provide the functionality of switching a speech control facility on and off. Misinterpretation by the speech recognition facility can occur, however, and therefore incorrect execution of a command, in particular if the user employs a word which the speech control facility interprets as a command while the user was not directing this word at the domestic appliance, but to another person in the room for example.

BRIEF SUMMARY OF THE INVENTION

Given this background, an object of the present invention consists in further improving a domestic appliance with a speech recognition device. A further object of the present invention is to improve a method for operating a domestic appliance.

Accordingly a domestic appliance is proposed which has a user interface for a user to input commands, a camera for taking an image of an operating area from which said user interface can be operated by the user, a speech recognition device for detecting a speech command, and a control device configured to determine a level of security depending on the image that was taken by the camera and to execute the speech command detected by said speech recognition device depending on the level of security that has been determined.

As a result of a security level being determined depending on the image taken by the camera, it is possible to establish how well the domestic appliance is being supervised by the user. The security level accordingly specifies the degree of supervision by the user. If there is no user situated in the operating area of the domestic appliance then the domestic appliance is considered to be unsupervised. If there is indeed a user situated in the operating area but whose glance is not directed at the domestic appliance then the domestic appliance is only moderately supervised by the user. If the user's glance is directed toward the domestic appliance, however, then the domestic appliance is considered to be well supervised. The security level can be determined with the aid of the image taken by the camera.

The speech recognition device can only ever detect the speech commands correctly with a certain degree of probability. As a result of the speech command being executed depending on the security level determined, it is possible to decide for each speech command whether the combination of the security level determined and the probability of correct speech recognition is sufficient to execute the speech command. It is therefore possible to prevent speech commands which demand monitoring by the user being executed without the domestic appliance being correspondingly supervised by the user.

According to an embodiment of the domestic appliance the security level is a numerical value. In this regard the numerical value represents a quantitative measure of the supervision of the domestic appliance by the user. Advantageously the security level can be mapped quantitatively as a numerical value so that it can be used in an algorithm, which the control device executes, as a measure of the supervision of the domestic appliance by the user.

According to a further embodiment of the domestic appliance the speech recognition device is set up to specify a probability of a correct detection of the speech command, and the control device is set up to take into account the probability for a decision regarding an execution of the speech command.

Speech recognition devices belong to a class of technical systems whose reliability is founded on the basis of statistical considerations. It follows that a speech recognition device can never detect a speech command with 100% certainty. It is only ever possible to specify a probability with which the speech command was detected correctly.

According to a further embodiment of the domestic appliance the speech recognition device has a microphone, an amplifier, and a microprocessor circuit. With the aid of these elements the speech recognition device can detect a speech command and specify the probability with which the speech command was detected correctly.

According to a further embodiment of the domestic appliance the microprocessor circuit has an analog-to-digital converter, a first microprocessor, and an interface to the control device. Advantageously the microprocessor circuit has a first microphone. The estimation of the probability with which the speech command was detected correctly can therefore already be undertaken in the speech recognition unit. Consequently the control device does not need to be burdened with this task.

According to a further embodiment of the domestic appliance the control device has a second microprocessor and an interface for activating mechanical switches on the domestic appliance. As a result the control device can control the domestic appliance correspondingly.

According to a further embodiment of the domestic appliance the microprocessor circuit and the control device are an integrated component, wherein the first microprocessor and the second microprocessor are realized in the form of a single microprocessor. Advantageously a single electronic component is used in this case in place of two electronic components. This helps to save on material and costs.

According to a further embodiment of the domestic appliance the control device is set up to define the security level depending on whether an evaluation of the image from the camera produces the result that the user is present in the operating area.

If the user is not present in the operating area then a minimal security level is not reached. The domestic appliance is considered to be unsupervised in this case. If the user is present in the operating area on the other hand then at least a minimal security level is reached, i.e. the domestic appliance is considered to be at least under minimal supervision in this case.

According to a further embodiment of the domestic appliance the control device is set up to define the security level depending on whether an evaluation of the image from the camera produces the result that the user is turned toward the domestic appliance.

If the user is present in the operating area but is not turned toward the domestic appliance then a minimal security level is reached. In this case the domestic appliance is considered to be under minimal supervision. If the user is turned toward the domestic appliance than at least a high security level is reached. In this case a high degree of supervision of the domestic appliance by the user is reached.

According to a further embodiment of the domestic appliance the control device is set up to define the security level depending on whether an evaluation of the image from the camera produces the result that the speech command originates from a user authorized to operate the domestic appliance.

If the user is turned toward the domestic appliance but the speech command does not originate from a user authorized to operate the domestic appliance then only a predetermined, for example high, security level is reached. In this case a high degree of supervision of the domestic appliance by the user is reached. The predetermined security level can also be zero however. If the speech command originates from a user authorized to operate the domestic appliance on the other hand then an optimal security level is reached. In this case an optimal degree of supervision of the domestic appliance by the user is reached.

According to a further embodiment of the domestic appliance the control device is set up to not execute a speech command at a first security level and to execute the said speech command at a second higher security level. Advantageously the control device can therefore decide whether a security level is sufficient to execute a speech command which was detected correctly with a certain probability.

According to a further embodiment of the domestic appliance the speech recognition device comprises a speaker recognition unit for recognizing the user, wherein the control device is set up define the security level depending on the user recognized. Advantageously a user can also be recognized on the basis of the said user's voice.

According to a further embodiment of the domestic appliance the said domestic appliance furthermore has a display unit for displaying a change elicited by the speech command. The display unit can take the form of a visual display for example.

According to a further embodiment of the domestic appliance the domestic appliance is a domestic cooking appliance, in particular a cooker, an oven, a steam cooker, or a warming drawer.

Advantageously domestic appliances with a speech recognition device can be usefully employed primarily in the kitchen. This is the case because the hands are frequently "busy with other things" in the kitchen. Furthermore the hands are frequently dirty in the kitchen as a result of which the domestic appliance can likewise become dirty in the case of manual operation. Additionally the hands are frequently slippery precisely in the kitchen which makes it impossible to get a reliable grip, e.g. on a rotary switch.

Furthermore a method for operating a domestic appliance is described with the following steps: taking an image of an operating area of the domestic appliance, detecting a speech command, determining a security level depending on the image taken, and executing the speech command which is detected depending on the security level which is determined.

As a result of a security level being determined depending on the image taken it is possible to establish how well the domestic appliance is being supervised by the user. As a result of the speech command which is detected being executed depending on the security level which is determined it is possible to make sure that a speech command is only executed if the security level is high enough for that speech command.

Every speech command has a certain probability of being detected correctly. If the speech command has only a low probability of being detected correctly then the security level should be correspondingly high in order that the user can intervene manually in the event of doubt. If the speech command is recognized incorrectly then the user can still intervene manually but only if the said user is supervising the domestic appliance, i.e. notices the error.

The embodiments and features described for the proposed device apply correspondingly to the proposed method.

Further possible implementations of the invention also comprise combinations, not explicitly stated, of features or embodiments described previously or in the following with reference to the exemplary embodiments. In this regard the person skilled in the art will also add individual aspects as improvements or additions to the respective basic form of the invention.

BRIEF DESCRIPTION OF THE DRAWINGS

Further advantageous embodiments and aspects of the invention form the subject of the dependent claims and also the exemplary embodiments of the invention described in the following. In further respects the invention is explained in detail on the basis of preferred embodiments while making reference to the enclosed figures.

DETAILED DESCRIPTION OF EXEMPLARY EMBODIMENTS OF THE PRESENT INVENTION

Identical or functionally identical elements are labeled with the same reference symbols in the figures, unless stated otherwise.

Figure 1:
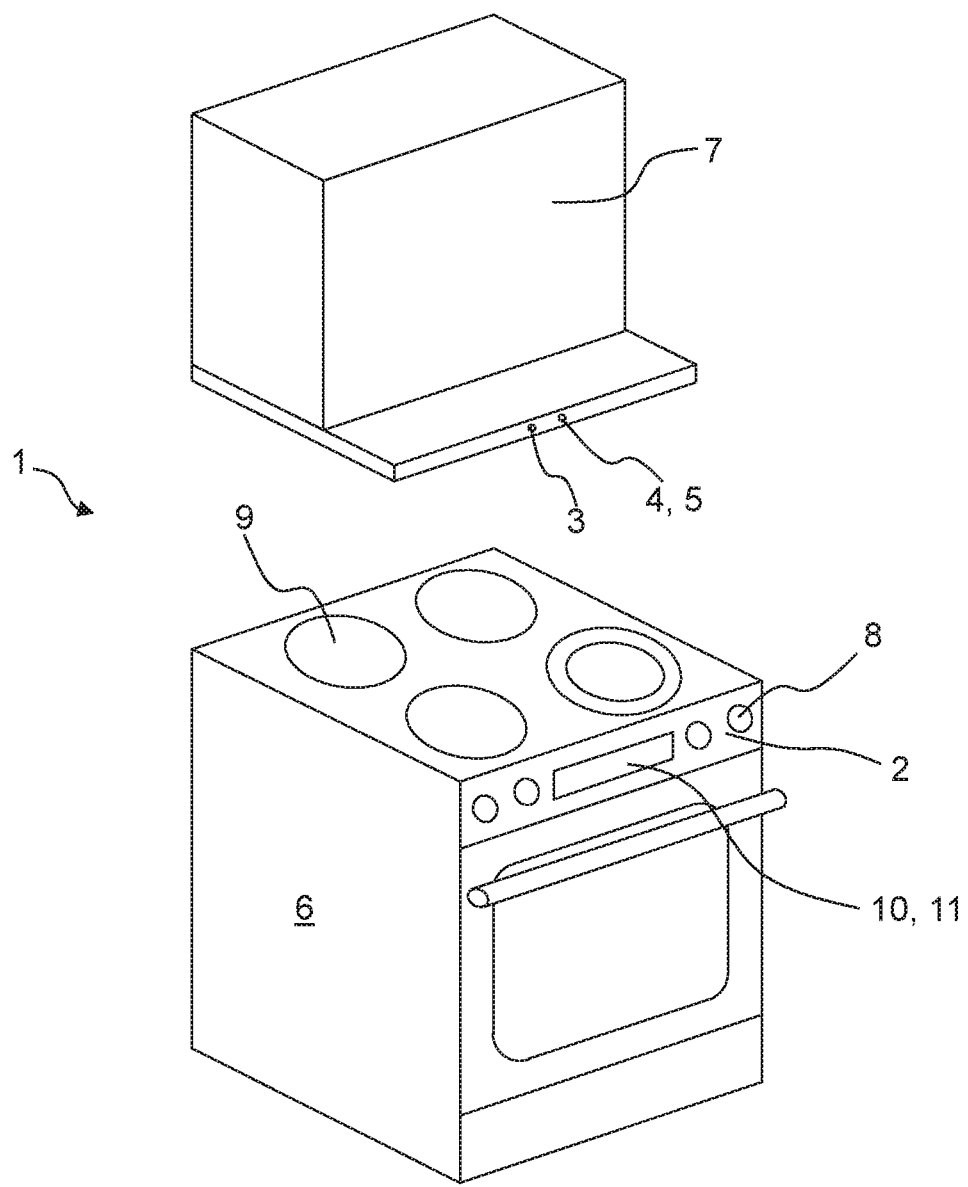
FIG. 1 shows a perspective view of a domestic appliance according to an exemplary embodiment of the invention.

FIG. 1 shows perspective view of a domestic appliance 1 according to an exemplary embodiment of the invention. The domestic appliance 1 has a user interface 2, a camera 3, a speech recognition device 4, and a control device 5. The domestic appliance shown in FIG. 1 consists of a cooker 6 and a fume extractor hood 7. In this regard the camera 3, the speech recognition device 4, and the control device 5 are arranged in the fume extractor hood 7.

The user interface is provided for a user to input commands. To this end it has a plurality of rotary switches 8. Situated in front of the user interface 2 is the operating area. In this regard the operating area is that area from which the user interface 2 can be operated (see FIG. 3). The camera 3 is set up to take an image of the operating area.

With the aid of the speech recognition device 4 a speech command can be detected. The image taken by the camera 3 and the speech command detected by the speech recognition device 4 are then subjected to further processing by the control device 5. On the one hand the control device 5 determines a security level depending on the image that was taken. On the other hand the control device 5 decides whether the speech command detected is executed at the present security level.

A numerical value can be assigned to each individual security level. In this regard the numerical value represents a quantitative measure for the supervision of the domestic appliance 1 by the user. In the case of a high numerical value the domestic appliance 1 is well supervised, e.g. if the user is turned toward the domestic appliance 1. If a user is situated in the operating area of the domestic appliance 1 but is not turned toward the domestic appliance 1 then a low numerical value is given in the case of the existing minimal security level.

Detection of the speech command by using the speech recognition device 4 is not 100% certain. The speech command is only recognized correctly with a certain probability. Consequently the speech recognition device 4 is set up to specify the probability with which the speech command was recognized. The control device 5 can take account of the probability with which the speech command was recognized correctly.

As a result of the speech command being executed depending on the security level which is determined it is possible to decide for every speech command whether the combination of the security level determined and the probability of correct speech recognition is sufficient to execute the speech command. It is therefore possible to prevent speech commands that demand monitoring by the user being executed without the domestic appliance 1 being correspondingly supervised by the user.

For example switching on the hotplates 9 requires a substantial measure of supervision by the user, i.e. a high security level. If the user is turned toward the cooker 6 then the speech command "Switch the hotplates on" can also be executed if the speech command was not detected with absolute certainty. The user, who is turned toward the cooker 6, can see that the hotplates 9 were switched on and intervene correspondingly where appropriate. If the user is not turned toward the cooker 6 on the other hand then the speech command "Switch the hotplates on" will not be executed in the case of minor uncertainties about the correct detection of the speech command. The user is not supervising the cooker 6 and accordingly can also not see if the hotplates 9 are switched on. Accordingly the speech command is not executed at the lower security level but is at the higher security level.

The domestic appliance 1 can have a display unit 10 to display changes which were elicited by a speech command. For example the display unit 10 comprises a visual display 11.

Figure 2:
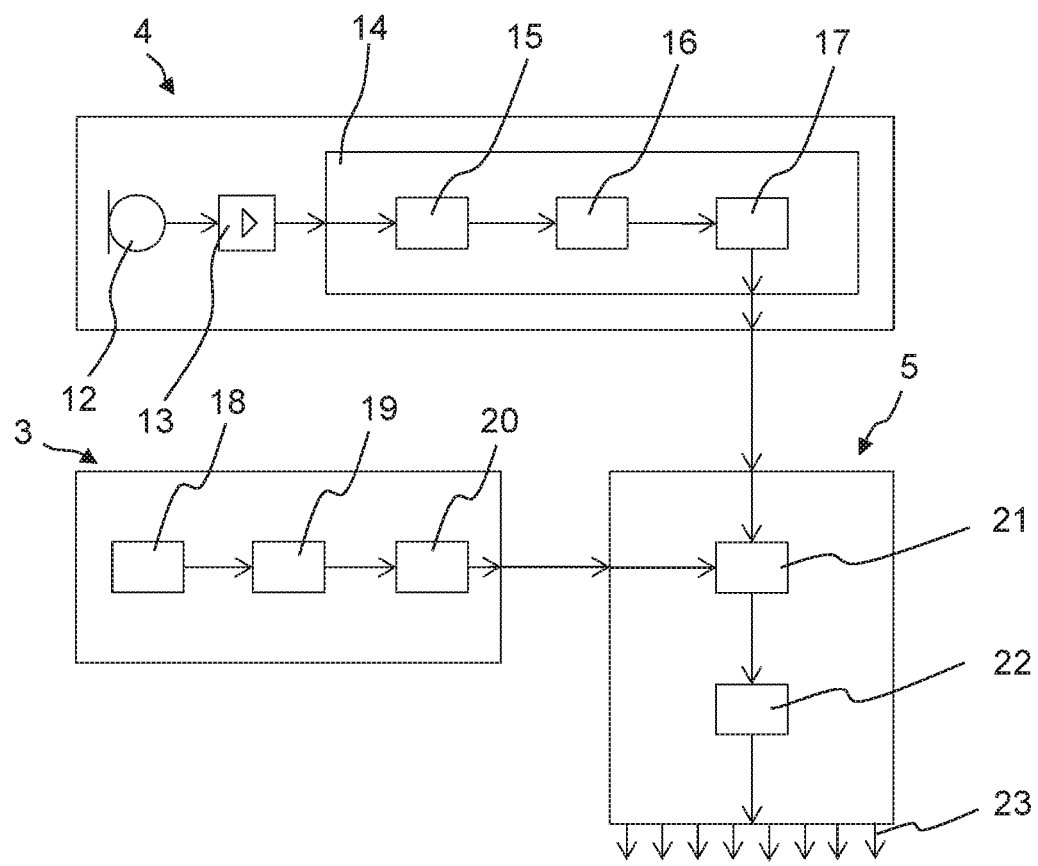
FIG. 2 shows a schematic view of the speech recognition device, the control device, and the camera of the domestic appliance from FIG. 1.

FIG. 2 shows a schematic view of the speech recognition device 4, the control device 5, and the camera 3 of the domestic appliance 1 in FIG. 1. The speech recognition device 4 detects a speech command and specifies the probability with which the speech command was detected correctly. The camera 3 takes an image. The control device 5 reads in the speech command detected by the speech recognition device 4 and the image taken by the camera 3.

The speech recognition device 4 has a microphone 12, an amplifier 13, and a microprocessor circuit 14. The microprocessor circuit 14 comprises an analog-to-digital converter 15, a first microprocessor 16, and an interface 17 to the control device 5.

The microphone 12 picks up spoken sound signals and passes them on to the amplifier 13. The amplifier 13 amplifies the sound signals and passes them on to the microprocessor circuit 14. The analog-to-digital converter 15 of the microprocessor circuit 14 digitizes the sound signals. The digitized sound signals are then evaluated in the framework of a recognition algorithm with the aid of the first microprocessor 16. If a sequence of words has been recognized and this sequence corresponds to a previously defined arrangement of words then this ordered string of words corresponds to a speech command. The speech command has a certain probability of being recognized correctly. The speech command and the probability of correct recognition are sent on via the interface 17 to the control device 5. A corresponding process applies to single-word commands.

The camera 3 has a detection unit 18 for taking and digitizing an image, a third microprocessor 19, and an interface 20 to the control device 5. The control device 5 can therefore read in, in digitized form, an image taken by the camera 3.

The control device 5 has a second microprocessor 21 and an interface 22 to multiple outputs 23. The outputs 23 are used for activating mechanical switches on the cooker 6.

Alternatively the microprocessor circuit 14 and the control device 5 can be an integrated component. As a further alternative the third microprocessor 19 of the camera 3 can likewise be part of the integrated component.

Figure 3:
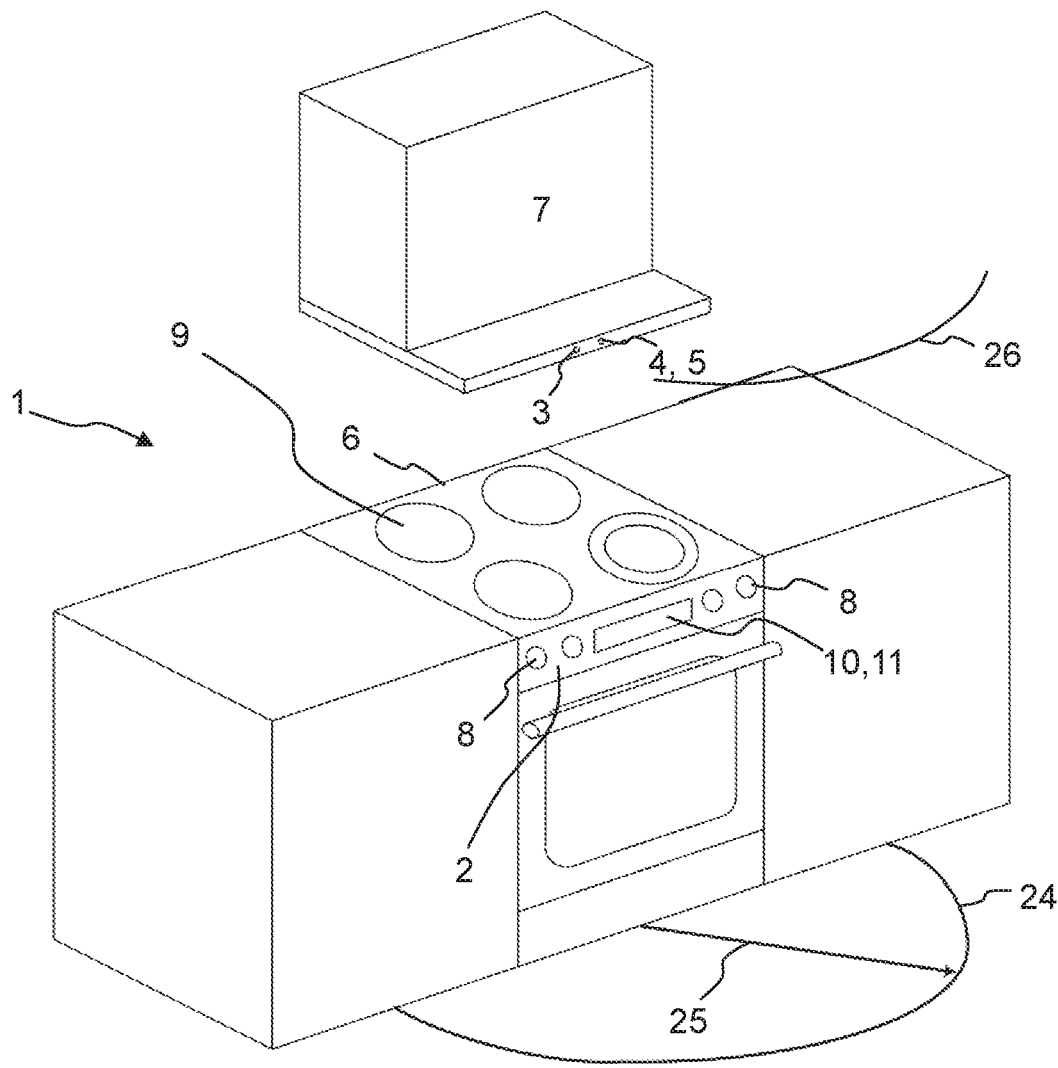
FIG. 3 shows the operating area of the domestic appliance from FIG. 1.

FIG. 3 shows an operating area 24 of the domestic appliance 1 in FIG. 1. In this regard the operating area 24 is defined as the area from which the user can operate the user interface 2. Accordingly the operating area 24 can be formed by a radius 25 with the user interface 2 as the central point.

If the user is present in the operating area 24 then the said user's head is situated in the head area 26. Naturally this does not apply to children who have a smaller body size. Children therefore only reach a lower security level.

Figure 4:
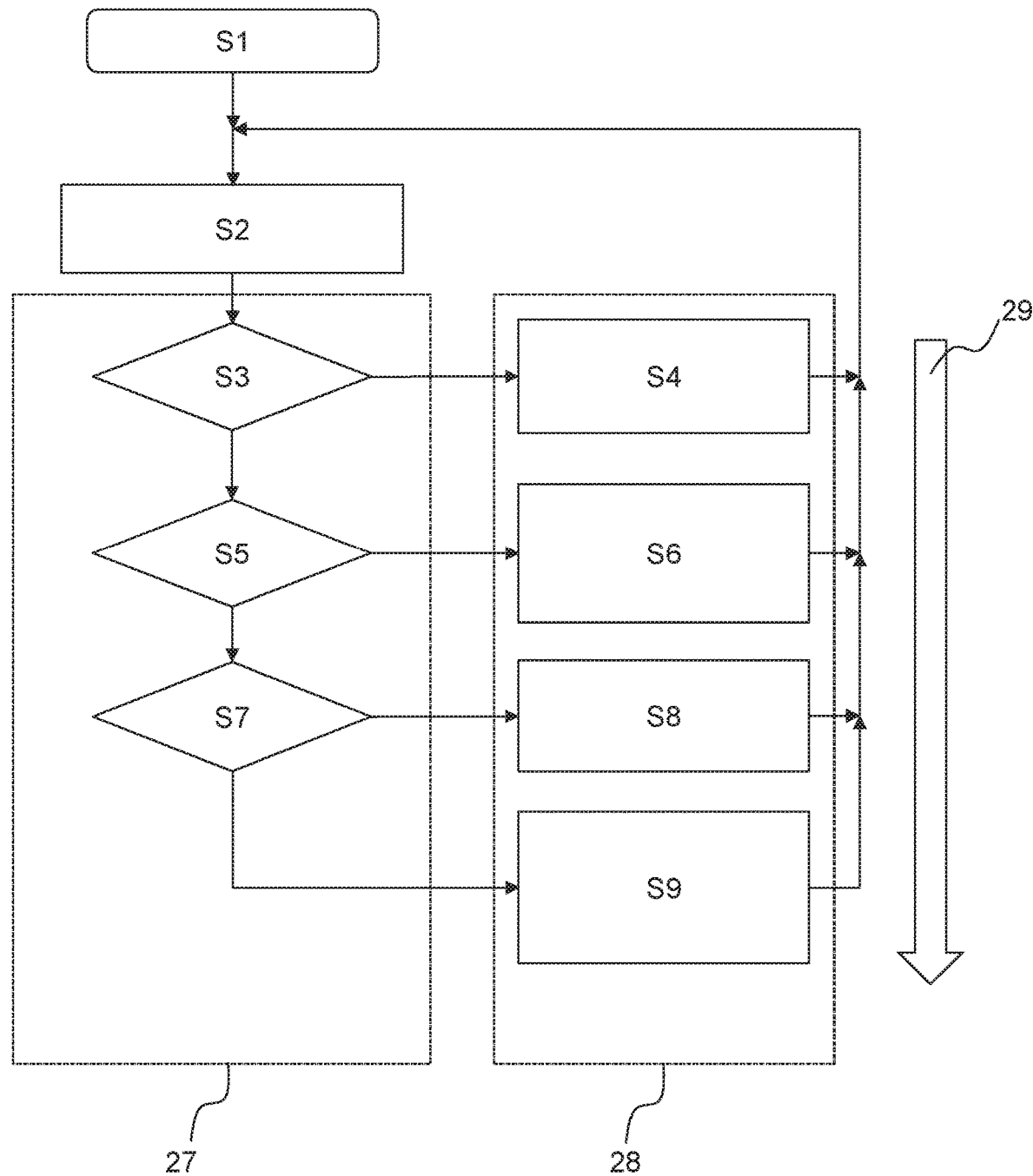
FIG. 4 shows a flowchart for the speech recognition facility of the domestic appliance from FIG. 1.

FIG. 4 shows a flowchart for the speech recognition facility of the domestic appliance 1 in FIG. 1.

The evaluation is started in a first step S1.

In a second step S2 the camera 3 takes an image of the operating area 24, and in particular of the head area 26. In addition the image is evaluated.

In a third step S3 a check is carried out as to whether a user can be seen in the image. The control device 5 defines the security level depending on whether the user is present in the operating area 24.

If the user is not present in the operating area 24 then a minimal security level is not reached. In this case the domestic appliance 1 is considered to be unsupervised. Step S4 then follows in the flowchart.

If the user is present in the operating area 24 on the other hand then at least a minimal security level is reached, i.e. the domestic appliance 1 is considered to be under minimal supervision in this case. Step S5 then follows in the flowchart.

In a fourth step S4 a minimal security level is not present. The domestic appliance 1 is considered to be unsupervised. Consequently every speech command is ignored even if there is a very high probability that the speech command was recognized correctly.

In a fifth step S5 a check is carried out as to whether a face can be recognized in the image from the camera 3. If a face can be recognized in the image then the user is turned toward the domestic appliance 1. The control device 5 defines the security level depending on whether the user is turned toward the domestic appliance 1.

If the user is present in the operating area but is not turned toward the domestic appliance 1 then a minimal security level is reached. The domestic appliance 1 is considered to be under minimal supervision in this case. Step S6 then follows in the flowchart.

If the user is turned toward the domestic appliance 1 then a high security level is reached. In this case a high degree of supervision of the domestic appliance 1 by the user is reached. Step S7 then follows in the flowchart.

In a sixth step S6 the security level is minimal. The domestic appliance 1 is considered to be under minimal supervision. Every speech command which has been detected correctly with an adequately high probability, and which is plausible for the domestic appliance 1, is executed. In this regard "plausible" means that the speech command fits in the context of the previous settings of the domestic appliance 1.

In a seventh step S7 a check is carried out as to whether a user can be recognized in the image from the camera 3 and whether the user recognized is authorized to operate the domestic appliance 1. The control device 5 defines the security level depending on whether a user who is authorized to operate the domestic appliance 1 is recognized.

If the user is turned toward the domestic appliance 1 but the speech command does not originate from a user authorized to operate the domestic appliance 1 then a high security level is reached. In this case a high degree of supervision of the domestic appliance 1 by the user is reached. Step S8 then follows in the flowchart.

If the speech command originates from a user authorized to operate the domestic appliance 1 on the other hand then an optimal security level is reached. In this case an optimal degree of supervision of the domestic appliance 1 by the user is reached. Step S9 then follows in the flowchart.

In an eighth step S8 the security level is high. The degree of supervision of the domestic appliance 1 is accordingly high. Every speech command which has been detected correctly with an adequately high probability is executed.

In a ninth step S9 the security level is optimal. The domestic appliance 1 is considered to be under optimal supervision. Every speech command is executed even if the probability that the speech command was recognized correctly is low.

The steps S3, S5, and S7 specified in the first section 27 specify criteria for deciding which security level is present. The security level, i.e. the degree of supervision by the user, rises in the direction of the arrow 29. The steps S4, S6, and S8 specified in the second section 28 specify whether a combination of a probability of correct detection of the speech command and the respective security level is sufficient to execute the speech command.

Alternatively the speech recognition device 4 can also have a speaker recognition unit for recognizing the user. The speaker recognition unit can then recognize whether a user is authorized to use the domestic appliance 1.

Although the present invention has been described on the basis of exemplary embodiments, it can be modified in many different ways.

The invention claimed is:

1. A domestic appliance, comprising:
    a user interface configured to receive manual input from a user to control the appliance;
    a camera adapted to take an image of an operating area from which the user interface is operable by the user;
    a speech recognition device configured to detect a speech command; and
    a control device configured to:
        automatically determine a level of security based on an evaluation of the image taken by the camera, wherein
            (a) a first level of security corresponds to a failure to detect a presence of the user within the operating area,
            (b) a second level of security corresponds to detection of the presence of the user within the operating area,
            (c) a third level of security corresponds to detection of the presence of the user within the operating area and a detection of a presence of a face of the user, and
            (d) a fourth level of security corresponds to detection of the presence of the user within the operating area, detection of the presence of the face of the user, and a recognition that the user is authorized;
        in response to the fourth level of security, automatically execute the speech command detected by the speech recognition device; and
        in response to the first level of security, ignore the speech command detected by the speech recognition device;
        wherein the camera is configured to take the image of a head area of the operating area, such that detection of the presence of the user depends on a height of the user.

2. The domestic appliance of claim 1, wherein the level of security is a numerical value which represents a quantitative measure of a supervision of the domestic appliance by the user.

3. The domestic appliance of claim 1, wherein the speech recognition device is constructed to specify a probability of a correct detection of the speech command, said control device configured to take into account the probability for a decision regarding an execution of the speech command.

4. The domestic appliance of claim 1, wherein the speech recognition device includes a microphone, an amplifier operably connected to the microphone and configured to amplify a sound signal received from the microphone, and a microprocessor circuit receiving the amplified sound signal from the amplifier.

5. The domestic appliance of claim 4, wherein the microprocessor circuit includes an analog-to-digital converter adapted to digitize the sound signal, a first microprocessor configured to evaluate the digitized sound signal, and an interface connected to the control device.

6. The domestic appliance of claim 5, wherein the control device includes a second microprocessor and an interface in communication with the second microprocessor for activating mechanical switches on the domestic appliance.

7. The domestic appliance of claim 6, wherein the microprocessor circuit and the control device form an integrated component, said first and second microprocessors being constructed in the form of a single microprocessor.

8. The domestic appliance of claim 1, wherein the speech recognition device comprises a speaker recognition unit for recognizing the user, said control device being constructed to define the level of security depending on the user recognized.

9. The domestic appliance of claim 1, further comprising a display unit for displaying a change in response to the speech command.

10. The domestic appliance of claim 1, constructed in the form of a domestic cooking appliance.

11. The domestic appliance of claim 10, wherein the domestic cooking appliance is a cooker, an oven, a steam cooker, or a warming drawer.

12. A method for operating a domestic appliance, comprising:
    automatically taking an image of an operating area of the domestic appliance using a camera;
    detecting a speech command using a speech recognition device of the domestic appliance;
    using a control device of the domestic appliance, automatically evaluating the image taken by the camera;
    based on the evaluation of the image, automatically determining a first level of security if no user is detected within the operating area;
    based on the evaluation of the image, automatically determining a second level of security if a user is detected within the operating area;
    based on the evaluation of the image, automatically determining a third level of security if the user is detected within the operating area and a face of the user is detected;
    based on the evaluation of the image, automatically determining a fourth level of security if the user is detected within the operating area, a face of the user is detected, and the user is recognized to be authorized;
    in response to the fourth level of security, automatically executing the speech command detected by the speech recognition device; and
    in response to the first level of security, ignoring the speech command detected by the speech recognition device;
    wherein the camera is configured to take the image of a head area of the operating area, such that detection of the presence of the user depends on a height of the user.

13. The method of claim 12, further comprising:
    Specifying, using the speech recognition device, a probability of correct detection of the speech command; and
    responding to the third level of security by automatically executing the speech command only if the probability of correct detection is above a selected threshold.

14. The method of claim 12, further comprising determining that the user is authorized based on a facial recognition of the user within the image.

15. The domestic appliance of claim 1, wherein the recognition that the user is authorized is based on a facial recognition of the user within the image.

16. The domestic appliance of claim 1, wherein the speech recognition device is configured to specify a probability of a correct detection of the speech command; and
    wherein, in response to the third level of security, the control device is configured to automatically execute the speech command only if the probability of correct detection is above a selected threshold.

* * * * *